United States Patent
Oberholzer et al.

(10) Patent No.: US 10,089,860 B2
(45) Date of Patent: Oct. 2, 2018

(54) REMOTE CONTROL HAVING A BIOMETRIC SENSOR

(71) Applicant: NEEO AG, Solothurn (CH)

(72) Inventors: Raphael Oberholzer, Solothurn (CH); Andreas Koschak, Unterseen (CH)

(73) Assignee: NEEO AG, Solothurn (CH)

( * ) Notice: Subject to any disclaimer, the term of this patent is extended or adjusted under 35 U.S.C. 154(b) by 0 days.

(21) Appl. No.: 15/516,347

(22) PCT Filed: Oct. 29, 2015

(86) PCT No.: PCT/EP2015/075190
§ 371 (c)(1),
(2) Date: Mar. 31, 2017

(87) PCT Pub. No.: WO2016/066778
PCT Pub. Date: May 6, 2016

(65) Prior Publication Data
US 2017/0309162 A1    Oct. 26, 2017

(30) Foreign Application Priority Data
Oct. 31, 2014 (CH) ........................... 1673/14

(51) Int. Cl.
*G08C 17/02* (2006.01)

(52) U.S. Cl.
CPC ......... *G08C 17/02* (2013.01); *G08C 2201/61* (2013.01)

(58) Field of Classification Search
CPC .............................. G08C 17/02; G08C 2201/61
USPC ................................................ 340/12.5–12.55
See application file for complete search history.

(56) References Cited

U.S. PATENT DOCUMENTS

| 9,769,420 | B1 * | 9/2017 | Moses ..................... H04N 7/147 |
| 2010/0207727 | A1 * | 8/2010 | Kanekiyo ......... G06F 17/30247 340/5.82 |
| 2017/0188079 | A1 * | 6/2017 | Conrad ............ H04N 21/42201 |

FOREIGN PATENT DOCUMENTS

| EP | 1821238 A1 | 8/2007 |
| EP | 2667592 A1 | 11/2013 |
| JP | 2008085938 A | 4/2008 |
| JP | 2008306544 A | 12/2008 |

OTHER PUBLICATIONS

PCT/EP2015/075190 International Search Report dated Feb. 11, 2016.

* cited by examiner

*Primary Examiner* — Allen T Cao
(74) *Attorney, Agent, or Firm* — Wagenknecht IP Law Group PC.

(57) ABSTRACT

A remote control including at least one biometric sensor for detection of biometric feature data of the palmar area of a hand, at least one illuminant for illumination or exposure of the palmar area of the hand to be detected, at least one pressure or contact sensor, at least one processor, and one communication interface for generating and receiving commands or data, wherein the activation of the biometric sensor is functionally coupled to an activation of the at least one pressure or contact sensor that is arranged in a circumferential frame and/or in the rear of the remote control.

6 Claims, 2 Drawing Sheets

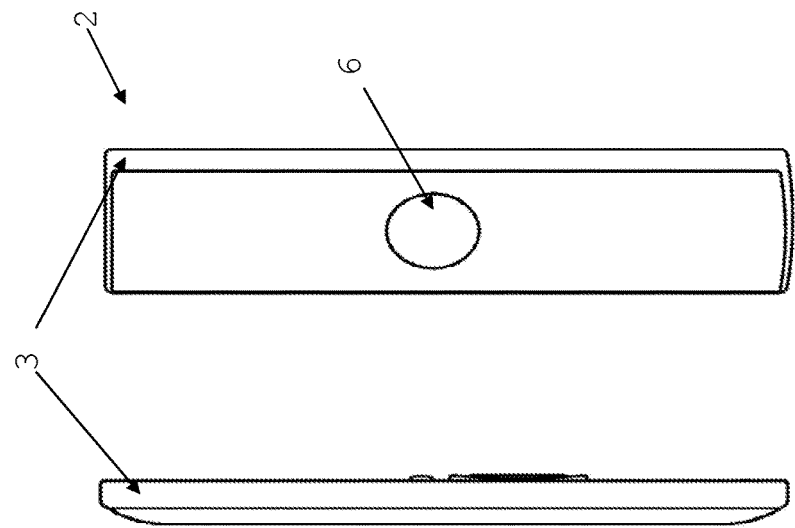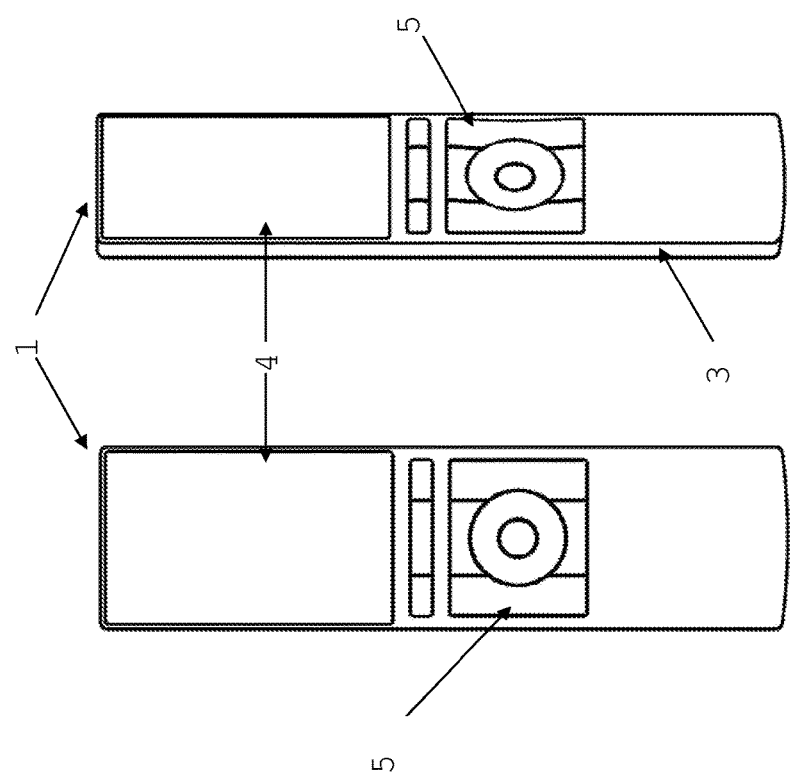

REMOTE CONTROL HAVING A BIOMETRIC SENSOR

CROSS REFERENCE TO RELATED APPLICATIONS

This is a US national phase application under 35 U.S.C. § 371 of international application no. PCT/EP2015/075190, filed 29 Oct. 2015, which claims benefit of priority to Switzerland application no. 01673/14, filed 31 Oct. 2014; the entire content of each is herein incorporated by reference in its entirety.

TECHNICAL FIELD OF THE INVENTION

The present invention relates to the field of the remote control of electronic equipment. In particular, the invention relates to remote controls that are designed for detecting biometric information for identification of individuals.

BACKGROUND OF THE INVENTION

Conventional remote controls are used to control individual items of equipment or are designed as so-called universal remote controls for controlling a plurality of different items of equipment. Although such remote controls have a multiplicity of control options, in principle any user or users can access the entire range of usage. In most cases, a personalized user profile can be accessed only by entering suitable passwords, PIN codes, or the like.

Remote controls with sensor systems for establishing, managing, and enabling personalized user profiles are also known in the prior art, however. Such remote controls have one or multiple sensors for detecting biometric data or information of a specific individual, which is why they are described as biometric sensors.

The printed publications U.S. Pat. No. 6,970,098 B1 and US 2003/0172283 A1 disclose a biometric remote control that ensures the authentication of a user based on biometric information or data, which are detected by means of suitable sensors, wherein a fingerprint, the speech pattern, the retina, or the face of a user are given as individualizing features of a user. A comparable remote control is described in the printed specification WO 2011/112727 A2, wherein optical scanners as well as those for detecting a fingerprint, a retina image, a face, a DNA or a speech pattern, as well as receivers for electromagnetic signals, means for electrical measurement, and microphones are mentioned as exemplary biometric sensors.

The remote controls disclosed in the aforementioned prior art are described in detail in terms of their design and their general function, although the selection and implementation of suitable biometric sensors is explained only in terms of functionality and no definite statements regarding practicability of the proposed sensor systems are made.

BRIEF SUMMARY OF THE INVENTION

The object of the present invention therefore is to provide an alternative remote control, with which the authentication or identification of a user based on biometric data or information is implemented in a relatively user-friendly manner, in that the user only takes the remote control with his hand in the usual manner without having to do anything additionally, as is the case with traditional remote controls suitable for biometrics.

This object is solved by providing the remote control designed to detect and at least partially to process, in conjunction with an authentication or identification of a user, biometric data or information about characteristic features of the user's palmar creases and/or hand vein structure, and for this purpose has at least one biometric sensor for the detection of biometric feature data of the palmar area of a hand, at least one illuminant for illumination or exposure of the palmar area of the hand to be detected, at least one pressure or contact sensor, at least one processor, and one communication interface for output and for receiving of commands or data, wherein an activation of the biometric sensor is functionally coupled to an activation of the at least one pressure or contact sensor, which is arranged in the circumferential frame and/or in the rear.

BRIEF DESCRIPTION OF THE DRAWINGS

FIG. 1 depicts a suitable remote control according to the invention, illustrated in four different perspectives (FIGS. 1A, 1B, 1C, 1D). It has a front 1, a rear 2 and a circumferential frame 3, and in the customary manner has a display 4 and a control panel or a control unit 5 with e.g. buttons. On the rear 2 in FIG. 1D an area is shown that is designed permeable for the biometric sensor 6.

DETAILED DESCRIPTION OF PREFERRED EMBODIMENTS

Figure 2:
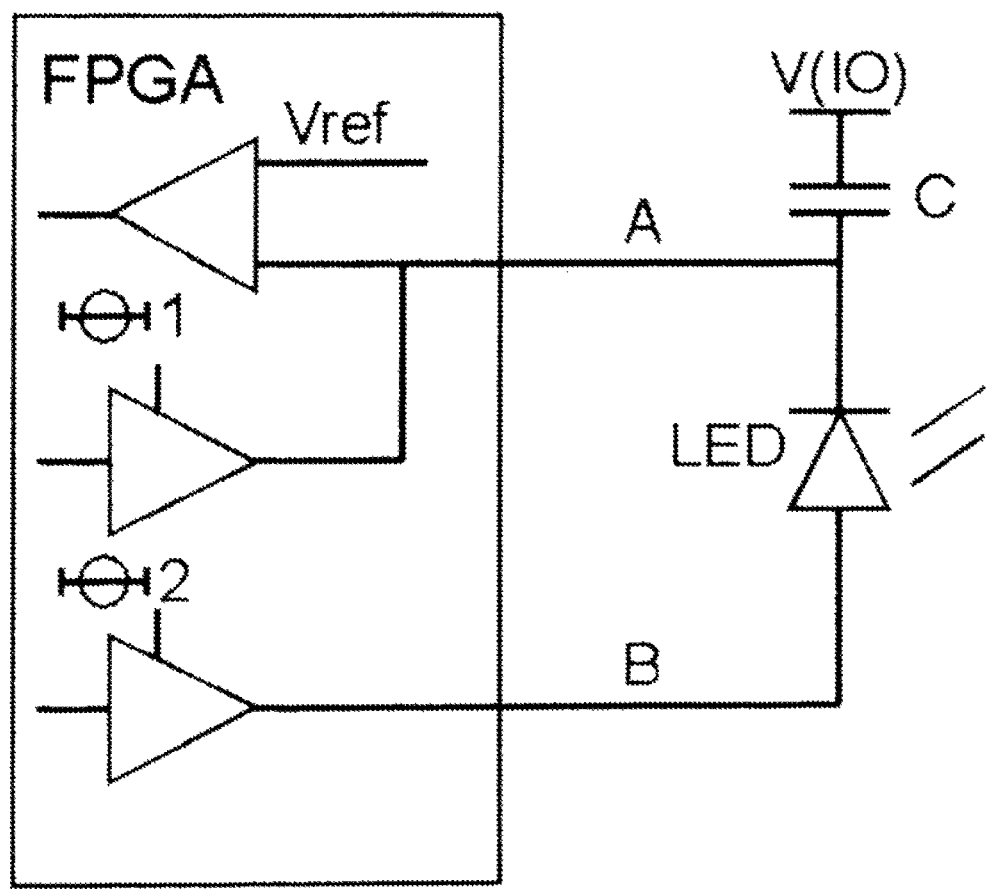
FIG. 2 is a circuit diagram to illustrate the preceding explanations using a photodiode array as biometric sensor.

The remote control for controlling electronic equipment such as television sets, set-top boxes, satellite receivers, and equipment for recording and/or the reproduction of audio and/or visual material, for example, and optionally for the control of processors found in other items, such as in the controls for drive mechanisms of roller shutters, louvers, or windows, or in the controls of systems for lighting or air conditioning, for example, by means of suitable signals comprises a housing having a substantially circumferential frame and a front and a back, a processor, and at least one biometric sensor for detecting biometric information from a user of the remote control and to forward the received or detected information to the processor, which is designed such that the identification or authentication of the user is possible by matching the information with previously stored biometric profile data.

The processor can furthermore receive the user's control commands and, if necessary after processing, forward them to a communication interface (KI), which is communicatively coupled to the processor. The interface is designed such that it can transmit one signal or multiple signals to an external receiver (device) and receive a series of signals or commands from an external source. The interface preferably comprises a transceiver, which is designed such that it can communicate with an external receiver (device) via an electromagnetic signal, a radio signal in the range of e.g. 2.4 or 5 GHz, an infrared signal, a Bluetooth signal, a ZigBee signal, a radio signal for electronic devices (RF4CE—"radio frequency for consumer electronics"), and/or a benign microwave signal. The interface preferably comprises a port or an interface, which is compatible with a USB cable, a micro USB cable, a HDMI cable, and/or an Ethernet cable, for example.

According to the invention, the biometric sensor is used for detection of data or information about individualizing characteristics of the palmar area of the hand, under which according to the invention the palmar creases and/or the hand vein structure are to be understood. Because the number of potential users of the remote control is usually rather low and may be, for example, up to 10 or up to 100 persons, it can be assumed that the detection of one or of both of these biometric characteristics is adequate for a sufficiently secure identification of a user.

A biometric detection system essentially consists of the components of sensor (measuring sensor), feature extraction, and feature comparison, wherein the sensor component provides the result as a biometric sample. Using feature extraction, all information supplied by the sensor that does not satisfy the required feature characteristics is removed by means of complex algorithms, so that as a result the biometric features are supplied. With the help of the feature comparator, a comparison value (score) is finally calculated between the biometric template stored during a learning phase and the current data record supplied by the feature extraction. If this comparative value is above or below a preferably adjustable threshold, the detection of a user or users of the remote control is considered successful.

During the learning phase ("enrollment"), the biometric feature data representing a reference pattern is stored encrypted in digital form, which can occur in a memory either within or outside of the remote control. During the next contact with the biometric system of the remote control, a current sample is taken and compared with the reference pattern (template). The system then decides whether the similarity of the two samples is sufficiently high and whether or not a possibly restricted initiation of use can occur.

In biometric identification methods, a distinction is generally made between verification and identification. In verification, the person to be verified must initially provide its name or user ID to the system, and the biometric system subsequently decides whether or not the person belongs to the associated reference feature data record. In the identification proposed according to the invention, the person to be identified exclusively discloses its biometric characteristic to the system, in the form of its palmar creases and/or hand vein structure, and from this the system then determines the associated name, the user ID, or the corresponding user profile, by a comparison with the reference feature data records of all stored users.

Because the samples supplied by the biometric sensor can be subject to significant statistical variations, false identification can occur occasionally, wherein the reliability of the identification is primarily evaluated based upon two criteria, namely the admission rate of unauthorized persons (false acceptance rate; FAR) and the rejection rate of authorized persons (false rejection rate; FRR). Both rates are inversely proportional to the decision threshold value, which is therefore adjustable according to the invention. A higher selected threshold decreases the FAR, but at the same time increases the FRR and vice versa, and thus stating the FAR alone without the associated FRR, for example, makes no sense. Assuming an FRR of 10%, the FAR in good biometric systems can reach values from 0.1% to below 0.000001%, depending on the characteristic. Although the FAR is a constant in verification systems with a specified decision threshold, in the present identification system it increases with the number of stored or recorded reference data records. By approximation, the resulting total FAR follows from the multiplication of the underlying identification FAR with the number of the data records. As previously mentioned, the identification match with the remote control according to the invention is not done compared with a large database with millions of entries, but compared with a collection of e.g. a maximum 10 or at most 100 of different reference feature data records, so that the previously explained dependence between FAR and FRR can preferably be shifted to benefit a user-friendly low FRR.

In biometric systems such as the present remote control, recognition time also plays an important role because in addition to safety and reliability, user acceptance and the usability or user-friendliness of a biometric system are decisive criteria.

The remote control according to the invention can be configured such that the biometric data or information (sample) received by the biometric sensor, if necessary following processing (e.g. by means of a component for feature extraction), are subjected to a match with reference feature data records stored in the remote control, wherein said match is performed within the remote control. Alternatively, the biometric information or data, optionally after processing (e.g. by means of a component for feature extraction), can also be forwarded via the interface to an external device, e.g. to a set-top box for performing the match with reference feature sets stored in the set-top box. In this case, the remote control receives a corresponding signal about the identification of the person from whom the previously mentioned sample has been received.

The remote control preferably further comprises a storage unit for storing instructions or instruction chains (macros) that can be executed by the processor, and for the storage of data, instructions, or instruction chains (macros) received via the communication interface and/or the port or the interface.

The aforementioned functionalities of the remote control can be provided on a one-chip system (system-on-a-chip, SoC; system-on-a-programmable-chip; SoPC) or distributed on multiple modules. In the case of a one-chip system, all or at least a large part of the functions of the remote control are integrated on one chip, i.e. an integrated circuit (IC) integrated on a semiconductor substrate (monolithic integration). If silicon is used as substrate material, this is alternatively referred to as a system-on-silicon (SoS). In the present case, the term "system" refers to a combination of different elements that are functionally coupled, i.e. together they provide a specific functionality such as a biometric sensor with evaluation electronics.

A suitable one-chip system according to the invention preferably consists of the processor, which is connected with a memory and the further periphery via a bus system. This processor can be both a very simple 8-bit-microcontroller as well as a very powerful multicore CPU, wherein according to the invention multi-processor systems are also suitable. Depending on the desired performance, application requirements, and further criteria such as power consumption, size, and price, in addition to its registers the SoC can optionally have only a small internal memory or alternatively/additionally one or multiple significantly larger external memories, which are still located in the remote control, however. This can be a SDRAM or flash memory, for example. A memory controller, which provides a corresponding interface for the memory, is preferably attached on the system bus, for this purpose.

Depending on the desired range of utilization and functionality, the remote control can also contain additional special processors to reduce the load on the actual main processor of the SoC. These can be processors for digital signal processing (DSPs) or e.g. encoding/decoding units or other hardware accelerators, so that individual calculations or even only portions thereof can be swapped out.

The aforementioned procedure of feature analysis is preferably done by application of the scale-invariant feature transformation ("Scale-invariant feature transform"; SIFT), an algorithm for extraction of local image features from the pattern provided by the biometric sensor (sample). In a first step, the biometric image data received, if necessary, is smoothened e.g. with a Gauss filter or by using the RANSAC algorithm ("Random Sample Consensus") to e.g. purge image noise and other data that do not meet the required feature characteristics. The image is then subdivided into local feature points that preferably are insensitive with respect to perspective distortion. Objects of the palmar creases and/or hand vein structure whose properties deviate from their background and are therefore suitable as individualizing features are prominent or relevant according to the invention. These objects can be characterized by their histograms, the features of which are stored as feature data record or reference feature data record, and are subsequently available for a feature comparison. The extracted features are insensitive with respect to coordinate transformations such as translation, rotation, and scaling, and are moreover robust against lighting variation, image noise, and minor higher-order geometric deformation as may occur e.g. due to projective mapping of a palmar area from different perspectives. For the object recognition, if desired, the data of multiple, randomly selected feature points of different images, can be compared for a match using e.g. the RANSAC algorithm.

In the alternative case of the preferred use of photodiode arrays according to the invention, which will be explained in detail in the following, a matrix of light emitting diodes (LEDs) is available for detection of the biometric data, which LEDs are particularly preferably designed for light with a wavelength in the IR or the NIR range. If electrical current flows through a diode in the transmitting direction, it emits light, preferably infrared radiation with a wavelength depending on the semiconductor material and the doping, and can therefore be used as lighting or illumination means (light source) in the transmittal mode. In addition to this at least one exposure diode, the array furthermore comprises multiple additional LEDs/photodiodes, which in the receiving mode are used as receiver diodes when being operated in the inverse direction. In principle, therefore, an LED transmitting and receiving cell consists of a light emitting diode with a preferably wide angle of dispersion and a low-tolerance capacitor. These two components are connected in series and are controlled by means of two signals A and B from the processor (preferably provided as FPGA) (see FIG. 2). Therefore, after the exposure diode has generated a flash, which illuminates one or several areas of the palmar area of the hand, a capacitance-to-time-converter (CTC) on a Field Programmable Gate Array (FPGA) measures the values detected from the receiver diodes, which enables to establish a three-dimensional image of the palmar area of the hand. The receiving mode operates in two phases (see FIG. 2). The anode of the LED is attached to network B. The cathode and the one connection of the capacitor are attached to network A, while the second connection of the capacitor is attached to the supply voltage. The connection can also be applied inversely, wherein the cathode of the LED is then attached to network B, while the anode and the one connection of the capacitor are attached to network A and the second connection of the capacitor is attached to signal ground. In phase 1, the network between capacitor and LED is charged to the I/O nominal voltage (ground) of the controller. For that purpose, both control signals are set as output to the nominal voltage of the controller (or ground, respectively). In phase two, the network between capacitor and LED is recharged by the photocurrent of the receiving LED. For this purpose, the signal B is switched to ground (or nominal voltage, respectively) and the signal A is configured as reception (high impedant). In this context, the receiving cell is configured such that it acts differentially, i.e. the input is formed from the digital difference between the network A and a reference voltage (preferably 2.5 V). The time until reaching the reference voltage is measured, which results in the response of the receiving cell to the illumination by the transmission cell (see FIG. 2).

The data processing by feature extraction and feature comparison is done by application of the previously explained scale-invariant feature transform process (SIFT).

The previously mentioned FPGAs and SoCs/SoPCs are very suitable to ensure the functionalities expected from the presently described remote control, sometimes with several processes running in parallel and under difficult real-time requirements, and are therefore preferred. Because an SoPC includes both FPGA logic for implementation of algorithms for signal processing as well as a microprocessor, the technical and functional possibilities of both platforms are advantageously combined.

The memory in a one-chip system is used either for archiving and execution of the program (program memory) or preferably for archiving and processing of data such as biometric data and/or reference feature data records (data memory). The design of the memory can be SRAM, DRAM, or Flash.

In the light of the preceding explanations, it is clear that the biometric sensor for the detection of one or of several characteristics of the palmar area of the hand (palmar creases and/or hand vein structure) must be an optical sensor and is selected from the group consisting of CCD sensors, CMOS sensors, and photodiodes, wherein both CMOS sensors and photodiode arrays are preferred according to the invention.

For example, an active pixel sensor (APS), a semiconductor detector for light measurement that is produced in CMOS technology and therefore called a CMOS sensor, is suitable. In contrast to the passive pixel sensor (PPS) that is also produced in CMOS technology, every image element includes an amplification circuit for signal readout. Using CMOS technology makes it possible to integrate further functions into the sensor chip, such as e.g. the exposure control, the contrast correction, the feature extraction, and/or the analog-digital conversion.

The easiest realization of an integrating APS image element consists of a photodiode, which is operated in inverse direction, as a photosensitive element and three n-channel MOSFETs (field-effect transistors). When starting the exposure measurement, the voltage across the photodiode is set to a defined initial value by means of the reset transistor. During the subsequent brightness measurement, the barrier layer capacitance of the photodiode is discharged by the photo current, wherein the voltage across the diode drops proportionally to irradiance and to exposure time. After the exposure time has elapsed, this voltage value is read and provided to analog post-processing or is immediately provided to an analog-digital converter. For this purpose, every image element has an amplifier transistor, which by means of the select transistor is connected to a readout circuit common for all image elements on a row, mostly in a column-by-column manner.

According to the invention, above every image element of the sensor or the sensors is a microlens (spherical, aspherical or astigmatic), which direct the total incident light onto the light-sensitive part. Photodiode arrays, which are virtually a n×1-CMOS sensor, are also suitable as a special form of the CMOS image sensors within the scope of the present invention.

According to the invention, the CMOS sensors are preferred because compared to CCD sensors they have a higher sensitivity in the range of shortwave infrared radiation (NIR range). Usually, the maximum sensitivity for CMOS sensors is in the NIR range (greater than 650 nm), while the maximum of CCD sensors is in the visible range (green light, 550 nm). CMOS sensors are also preferred because they have a comparatively smaller installation size than CCD sensors due to the integration of evaluation logic on the same chip (SoC).

The suitable exposure for recording a partial area of the palmar area of the hand by the biometric sensor occurs in a wavelength range that is compatible with the type of sensor used. In the preferred case of using one or multiple CMOS sensors, the illumination or lighting is therefore done in the IR or NIR wavelength range of 0.78 μm to 1 mm. For illumination, the remote control therefore preferably includes one or multiple photodiodes that are capable of emitting light within the desired wavelength range. With the remote control according to the invention, which must guarantee the procedure of identifying a user without cumbersome grasping around, i.e. more or less by "lying in the hand," the rear has a corresponding window through which light of the desired wavelength can pass, but which will prevent light passage of an undesirable wavelength range. Alternatively, the entire rear or substantial areas of the same can be designed for passage of light of the desired wavelength, such as for passage of light in the NIR range, if it is ensured that the biometric sensor can receive the palmar creases and/or hand vein structure data assigned to it.

To save energy, it is preferred that the biometric sensor and the necessary light source for illumination, as well as that portion of the processor that provides related functionalities (e.g. feature extraction, feature comparison) are only activated for brief periods, because as soon as the (positive or negative) identification of a potential user is done, the components and functionalities necessary for achieving this can be transferred into an energy-saving mode or even be switched off. A preferred embodiment therefore provides coupling the activation of the biometric sensor, including the additional component parts or components required for the authentication, with the activation of a further sensor type, wherein this further sensor type is preferably selected from pressure sensors and/or capacitive contact sensors and is arranged in the circumferential frame and/or in the rear of the remote control. When grapping the remote control as preparatory action for an impending utilization of the same, the circumferential frame is contacted by the thumb on one side and on the other side (opposite) by at least one of the remaining four fingers of a hand, so that the circumferential frame on at least two positions, which are preferably reciprocally spaced at least two centimeters apart, is subjected to a contact pressure and/or to the occurrence of a touch, which can be detected by means of a suitable sensor system.

With the preferred remote control according to the invention, the contact pressure is measured, for example, on the solid body of the circumferential frame as a force-transmitting component of the remote control. If this pressure exceeds a specific minimum value, the processor ensures that the functional system unit of the biometric sensor is activated until the authentication or identification is completed. The same applies analogously in the case of an alternative or additional presence of at least one capacitive contact sensor in the circumferential frame and/or in the rear. Additionally, the activation of the biometric sensor may be coupled to the activation of a movement or acceleration sensor.

If the sensor type is a pressure sensor, it is preferred to apply thin piezoelectric films directly onto suitable measuring bodies within the area of the circumferential frame and/or the rear, wherein for this purpose preferably zinc oxide (ZnO) or aluminum nitride (AlN) is used. Alternatively, the pressure sensor can consist only of one material such as e.g. quartz, wherein strain gauges can be used in addition to an elastic base material.

Various types of pressure sensors can be used as a suitable pressure sensor according to the invention. The piezoresistive pressure sensor includes a diaphragm onto which electrical resistances have been applied, and in most cases is produced as a silicon pressure sensor. An electrical voltage is produced by means of a pressure-dependent diaphragm deformation onto which deformation-dependent resistances are indiffused. This pressure sensor type can be produced inexpensively and has a comparatively high sensitivity. Although the materials used for pressure measurement have a great temperature dependency, this effect can be neutralized by an electrical circuit generating the difference due to this effect being the same on all resistances. A frequency-analog pressure sensor is usually a piezoresistive pressure sensor that measures the pressure by means of strain gauges and is, in terms of circuitry, enhanced by a ring oscillator. By varying the pressure, the resistance of the strain gauges changes and consequently the frequency of the ring oscillator is out of tune. The emitted frequency is directly proportional to the applied pressure.

With a piezoelectric sensor, an electrical voltage is produced in a crystal by means of pressure through charge separation (piezoelectric effect). By pressure, ions are shifted inside the crystal, as a result of which an electrical charge proportional to the force forms on the surface. The charge is transformed into a proportional electrical voltage by means of a charge amplifier. By discharging the charge (short-circuit), any optional pressure can be set as zero point of the charge amplifier, whereby pressure changes can be measured directly.

A pressure sensor type that is also suitable according to the invention relates to the capacitive pressure sensor, which includes two capacitors indiffused into one silicon chip. Upon pressurization, the spacings between one diaphragm and two opposite capacitor plates on both sides is changed and as a result the capacities of the capacitors are changed in a negative sequence. The capacitors can be part of an internal amplifier, the output signal of which is dependent on the difference of the capacities.

In the present case, an inductive pressure sensor that operates with an inductive position sensor connected with a diaphragm is also suitable. Pressure changes exert a force on the diaphragm and move it. As a result, the position of an iron armature changes in the opposite direction in two coils, wherein the inductivity increases in the one coil while decreasing in the other coil. This difference can be very accurately determined electrically. Alternatively, this configuration can also be replaced by a differential transformer.

All of the aforementioned pressure and (capacitive) contact sensors are available on the market and generate a standardized electrical signal that can be easily processed by the subsequent functional signal chain unit (processor; DDC).

LIST OF REFERENCE NUMBERS

1 Front
2 Rear

3 Circumferential frame
4 Display
5 Control panel/control unit
6 Biometric sensor with illuminant

What is claimed is:

1. A device for remote control or remote operation of items of equipment that are equipped with a receiver for receiving the commands transmitted from the device, with a circumferential frame and one front and one rear, wherein the device is designed to detect and at least partially to process, in conjunction with an authentication or identification of a user, biometric data or information about characteristic features of the user's palmar creases and/or hand vein structure, and for this purpose comprises at least one biometric sensor for the detection of biometric feature data of the palmar area of a hand, at least one illuminant for illumination or exposure of the palm area of the hand to be detected, at least one pressure or contact sensor, at least one processor, and one communication interface for output and for receiving of commands or data, wherein an activation of the biometric sensor is functionally coupled to an activation of the at least one pressure or contact sensor, which is arranged in the circumferential frame and/or in the rear.

2. The device according to claim 1, wherein the at least one biometric sensor is an optical sensor, which is selected from the group consisting of a CCD sensor, a CMOS sensor, and a photodiode.

3. The device according to claim 2, wherein the at least one biometric sensor is a CMOS sensor or a photodiode array, which CMOS sensor or which photodiode array is designed for light or radiation in a wavelength range from 0.78 µm up to 1 mm.

4. The device according to claim 1, wherein the at least one illuminant is provided in a form of one or multiple LEDs.

5. The device according to claim 1, wherein the pressure or contact sensor arranged in the frame and/or in the rear is selected from the group consisting of a piezoresistive sensor, a piezoelectric sensor, a capacitive sensor, and an inductive sensor.

6. The device according to claim 1, wherein the rear, at least in certain areas, is designed permeable for light or radiation in a wavelength range from 0.78 µm to 1 mm.

* * * * *